(12) United States Patent  
Marinzet (10) Patent No.: US 9,371,922 B2  
(45) Date of Patent: Jun. 21, 2016

(54) VALVE HAVING A ROTATABLE STOPPER, AND WATER TREATMENT PLANT COMPRISING SUCH A VALVE

(75) Inventor: Bernard Laurent Gilbert Marinzet, Châteaurenard (FR)

(73) Assignee: Arkling Limited, Marina Bay (GI)

( * ) Notice: Subject to any disclaimer, the term of this patent is extended or adjusted under 35 U.S.C. 154(b) by 543 days.

(21) Appl. No.: 13/510,185

(22) PCT Filed: Nov. 15, 2010

(86) PCT No.: PCT/FR2010/000758  
§ 371 (c)(1),  
(2), (4) Date: Jul. 18, 2012

(87) PCT Pub. No.: WO2011/058249  
PCT Pub. Date: May 19, 2011

(65) Prior Publication Data  
US 2012/0279918 A1    Nov. 8, 2012

(30) Foreign Application Priority Data

Nov. 16, 2009   (FR) ...................................... 09 05487

(51) Int. Cl.  
*F16K 11/085* (2006.01)  
*F16K 5/04* (2006.01)

(52) U.S. Cl.  
CPC ........... *F16K 11/0856* (2013.01); *F16K 5/0407* (2013.01); *F16K 5/0464* (2013.01); *Y10T 137/86871* (2015.04)

(58) Field of Classification Search  
CPC ......... F16K 5/04; F16K 5/0407; F16K 41/00; F16K 11/105; F01L 33/02  
See application file for complete search history.

(56) References Cited

U.S. PATENT DOCUMENTS

| 2,503,639 | A |   | 4/1950 | Snyder |
| 2,676,782 | A | * | 4/1954 | Bostock ................... F16K 1/14 |
|           |   |   |        | 137/467 |
| 3,023,779 | A |   | 3/1962 | Cinnirella |

(Continued)

FOREIGN PATENT DOCUMENTS

| DE | 10 2005 031962 A | 1/2007 |
| EP |     1 194 691 B | 7/2004 |

(Continued)

*Primary Examiner* — Krishnan S Menon  
*Assistant Examiner* — Ryan B Huang  
(74) *Attorney, Agent, or Firm* — Frommer Lawrence & Haug LLP (57) ABSTRACT

The invention relates to a valve (24) comprising: a body (40) defining a cavity and provided with a first opening (60) that makes it possible to feed water into the cavity, a second opening that makes it possible to discharge water from the cavity, and a third opening that makes it possible to connect the cavity (41) with a chamber; a stopper (49) that is rotatable inside the cavity, the stopper comprising a depression (77) on the outer surface (90) thereof that contributes to the definition of a passage enabling the flow of water between the first and third openings in first angular positions of the stopper and moreover enabling the flow of water between the second and third openings in second angular positions of the stopper, a sealing device that makes it possible to ensure a sealed stopping of the first opening (60) by means of the stopper in said second angular positions of the stopper; and a second sealing device that makes it possible to ensure a sealed stopping of the second opening by means of a stopper in said first angular positions of the stopper.

22 Claims, 12 Drawing Sheets

(56) References Cited

U.S. PATENT DOCUMENTS

| | | | |
|---|---|---|---|
| 3,233,865 A * | 2/1966 | Panzica et al. | 251/309 |
| 3,572,383 A | 3/1971 | Natalizia | |
| 4,124,488 A | 11/1978 | Wilson | |
| 4,506,864 A * | 3/1985 | Hartmann | 251/174 |
| RE32,144 E * | 5/1986 | Keefer | 210/652 |
| 6,652,741 B1 | 11/2003 | Marinzet | |
| 2004/0154671 A1 | 8/2004 | Martins et al. | |
| 2006/0070672 A1 | 4/2006 | Martins et al. | |
| 2007/0044856 A1 | 3/2007 | Bonior | |
| 2008/0041471 A1 * | 2/2008 | Paterson et al. | 137/625.47 |

FOREIGN PATENT DOCUMENTS

| | | |
|---|---|---|
| EP | 1 862 713 A | 12/2007 |
| EP | 1 988 341 A | 11/2008 |
| EP | 2 103 852 A | 9/2009 |
| FR | 2 342 252 | 9/1977 |
| FR | 2827357 A1 * | 1/2003 |
| WO | WO 00/77397 A | 12/2000 |
| WO | WO 2006/025054 A | 3/2006 |
| WO | WO 2006/053414 A | 5/2006 |
| WO | WO 2009/022433 A | 2/2009 |

* cited by examiner

VALVE HAVING A ROTATABLE STOPPER, AND WATER TREATMENT PLANT COMPRISING SUCH A VALVE

This application is a 371 of PCT/FR2010/000758 filed on Nov. 15, 2010, published on May 19, 2011 under publication number WO 2011/058249 A, which claims priority benefits to French Patent Application 09/05487 filed Nov. 16, 2009, the entire disclosure of which is incorporated herein by reference.

BACKGROUND OF THE INVENTION

The present invention relates to a valve with a rotary stopper and a water-treatment plant comprising such a valve.

The invention relates notably to motorized three-way valves (i.e. with three connection interfaces) and to water-treatment plants for seawater or brackish water by reverse osmosis which incorporate such valves.

In the present application, unless explicitly or implicitly indicated to the contrary, the terms "cylinder" and "cylindrical" refer to a body delimited by—or a shape or a surface engendered by—parallel straight lines resting on a closed contour which may be circular.

DESCRIPTION OF THE PRIOR ART

In plants for desalinating seawater by reverse osmosis, the water to be treated is delivered to the inlet of a filtration device at an inlet pressure that is higher than the osmotic pressure of the water; usually, since the osmotic pressure of salt water is 25 bar, the water supply pressure at the inlet of the filter is at least equal to 25 bar, for example of the order of 30 to 100 bar, in particular of the order of 60 to 80 bar; recovered at the outlet of the filter is a concentrate of water called "brine" on the one hand, and an ultrafiltrate of desalinated water (which is at a pressure close to atmospheric pressure) on the other hand; the pressure of the concentrate at the outlet of the filter is usually not much less than the supply pressure of water to be desalinated, for example less than the supply pressure by a value of the order of 1 to 5 bar, since the pressure drop in the filter is slight.

Patents FR 2342252 and U.S. Pat. No. 4,124,488 describe a plant for purifying water by reverse osmosis comprising a piston pump delivering the pressurized water to the inlet of a reverse osmosis module (ROM) and receiving the pressurized brine leaving the module ROM via a controlled valve, in order to use the energy of the pressurized brine to compress/pressurize the water to be desalinated.

The piston of the pump is driven in an alternating translation movement by an electric motor.

According to one embodiment, a rear portion of the piston has two peripheral longitudinal grooves such that, the piston also being driven in an angular oscillation movement, the piston forms a stopper placing a chamber of the pump extending behind the piston in communication either with a duct for conveying brine originating from the ROM or with a discharge duct.

One drawback of this plant is that causing the piston to oscillate angularly requires causing the pump body to oscillate angularly, which causes an unnecessary consumption of energy. This causing of the pump body to oscillate angularly requires the pump to be connected to the circuits of the plant via flexible connectors, which has implementation problems notably because of the pressure of the water circulating in the plant.

Patents EP 1194691 and U.S. Pat. No. 6,652,741 describe a seawater treatment plant in which several piston pumps are driven by means of a hydraulic actuator and are controlled to ensure a stoppage time of each piston, at each end of stroke of the piston in question, and to ensure a constant total flow rate.

The intake of brine into a chamber of each pump for the recovery of energy from the "concentrate"; and the subsequent discharge of this concentrate, are carried out by a three-way valve or directional-flow valve.

This device, the valve or directional-flow valve, must satisfy several requirements: it must allow the passage of a high flow rate of water without causing considerable pressure losses; it must be designed to withstand the high pressure (of the order of 60 to 80 bar for example) of the brine leaving the osmotic filters; moreover, when no provision is made to stop the pistons of the pumps at the end of the stroke for a sufficient period, this device must then switch from a configuration for taking water into the pump to a configuration for discharging water from the pump, substantially instantaneously, at the precise moment when the pump piston in question stops at the end of the stroke.

The known valves and directional-flow valves do not satisfy these requirements simple and reliably.

SUMMARY OF THE INVENTION

One object of the invention is to propose a valve or directional-flow valve that is simple to manufacture and install, having a long service life and high reliability, causing little pressure loss, making it possible to close in a substantially sealed manner a duct for conveying brine connecting a filtration module to a piston pump and being able to change—"switchover"—, substantially instantaneously, from a configuration of supply in which the valve is traversed by a current of pressurized brine supplying the pump, to a configuration of discharging/emptying in which the valve is traversed by a current of brine discharged from the pump.

One object of the invention is to propose a valve or directional-flow valve that is improved and/or that remedies, at least in part, the shortcomings or drawbacks of the known valves and directional-flow valves.

One object of the invention is to propose a plant for treating seawater or brackish water comprising a pump and a three-way valve for supplying the pump with brine and for discharging the brine, that is improved and/or that remedies, at least in part, the shortcomings or drawbacks of the known water-treatment plants.

According to one aspect, the invention proposes a valve comprising:
 a valve body delimiting a cavity, the body being provided/pierced with a first orifice allowing water to enter the cavity, with a second orifice allowing water to be discharged from the cavity, and a third orifice making it possible to place the cavity and a chamber of a pump in communication;
 a stopper mounted so as to be able to rotate inside the cavity, the stopper comprising a recess on its outer face, this recess helping, with the body to form/delimit a passageway—which rotates with the stopper—allowing water to travel between the first and third orifices in first angular positions of the stopper—corresponding to a configuration of the valve allowing the pump to be supplied—, said passageway also allowing water to travel between the second and third orifices in second angular positions of the stopper—corresponding to a configuration of the valve allowing the pump to be emptied;

a first sealing device making it possible to stop in a substantially watertight manner the first orifice by the stopper in said second angular positions of the stopper; and a second sealing device making it possible to stop in a substantially watertight manner the second orifice by the stopper in said first angular positions of the stopper.

Notably when the outer face of the stopper is cylindrical, the recess may take the shape of a groove or flat extending along an axis orthogonal to the axis of revolution/rotation of the stopper, and have a width that is substantially/not much smaller than the diameter of the first and second orifices.

Preferably, in addition to said recess—first recess—said passageway comprises a second recess on the periphery/surface of the stopper, in particular a second recess of substantially annular shape which extends—at least in part—facing the third orifice, and a channel hollowed out in the stopper and connecting said first and second recesses.

The cross section of this channel may be not much smaller, equal or greater, than that of the first and second orifices in order to limit the pressure losses caused by the passage of the water in this channel and consequently in the valve.

In other words, and according to another aspect of the invention, what is proposed is a valve comprising a body delimiting a cavity and pierced with three orifices, and a stopper—or plug—mounted so as to rotate inside the body; the body comprises two housings leading into the cavity and surrounding respectively two of the three orifices; the valve also comprises two sealing members respectively placed slidingly in the two housings, and two pressing devices making it possible respectively to press the two sealing members against the stopper, in order to provide a substantially watertight stopping of a first of the three orifices, by the stopper, in second angular positions of the stopper and in order to provide a substantially watertight stopping of a second of the three orifices, by the stopper, in first angular positions of the stopper—distinct from the second angular positions.

According to a preferred embodiment, the housings take the shape of annular slots and the sealing members have an annular—or tubular—shape adapted to the shape of the portion of the stopper against which they are pressed, in particular a shape cut away like a bevel on a radius corresponding to the radius of a cylindrical portion of the stopper.

Preferably, each of the pressing devices comprises a channel, in particular several channels, which connect(s) one end of the housing in question that is opposite to the end (of the housing in question) that opens into the cavity: the pressing device associated with the sealing member surrounding a first of the orifices comprises at least one channel connecting the non-open end of the housing in question to a sleeve for connecting the valve to a duct conveying the water coming from a filtration module, while the pressing device associated with the sealing member surrounding a second of the orifices comprises at least one channel connecting the non-open end of the housing in question to the cavity.

These channels make it possible to place at equal pressure the non-open end of the housing in question and the duct conveying the water coming from the filtration module, respectively the cavity, and consequently make it possible to press against the stopper the "profiled" end of each of the sliding sealing members, notably when these members have a reduced thickness in their annular portion flush with the surface delimiting the cavity.

Moreover, accordingly, each of the pressing devices may comprise an elastically deformable member, such as a spring, placed in the corresponding housing, between the non-open end of the housing and the end of the corresponding sealing member, in order to keep the stopper and the sealing member in mutual contact when the valve is not operated and when no water current passes through it.

According to other preferred features:

the first and second orifices are facing one another, aligned along an axis that is (substantially) orthogonal to the axis of revolution of the cavity—which corresponds to the axis of rotation of the stopper—, these two axes being (substantially) coplanar;

the valve body is pierced with two other orifices—fourth and fifth orifices—which face one another, aligned along an axis that is (substantially) indistinguishable from the axis of revolution of the cavity, and the stopper is secured in rotation to a drive shaft extending through these two orifices.

According to another aspect of the invention, a water-treatment plant is proposed comprising a water-filtration module, a pump with a piston, a motor, a mechanism for the driving of the pump by the motor, and a three-way valve with a rotary plug as described in the present application, the valve being fitted to a duct connecting the pump to the filtration module, the stopper of the valve being rotated substantially continuously by the motor, in synchronism with the pump.

According one embodiment, the stopper is driven so as to rotate one rotation when the piston of the pump makes a complete cycle, i.e. one stroke in one direction and one return stroke.

The continuous rotation of the stopper, usually with a substantially constant rotation speed, and the features of the stopper allowing the valve to switch substantially instantaneously from a supply configuration—for supplying the pump—with pressurized brine to a configuration for discharging the brine, in particular when the respective diameters of the first and second orifices are equal and that the depth of the first recess is equal to the difference between the radius of the stopper—in line with this recess—and the radius of the orifices.

According to one embodiment, the stopper provides a "total" closure of the valve for only two determined angular positions of the stopper: in each of these positions, the stopper closes the passageway between the first and third orifices and the passageway between the second and third orifices—and also the passageway between the first and second orifices.

In other words, according to this embodiment, the first angular positions of the stopper are adjacent so as to form a first continuous angular range of first angular positions of the stopper, which extends substantially over 180° (angle degrees), and the second angular positions of the stopper are also adjacent so as to form a second continuous angular range of second angular positions of the stopper, which also extends over 180°.

Other aspects, features and advantages of the invention will appear in the following description which refers to the appended figures and illustrates, without being in any way limiting, preferred embodiments of the invention.

DETAILED DESCRIPTION OF THE INVENTION

Unless explicitly or implicitly indicated to the contrary, elements or members that are—structurally or functionally—identical or similar are indicated by identical references on the various figures.

Figure 1:
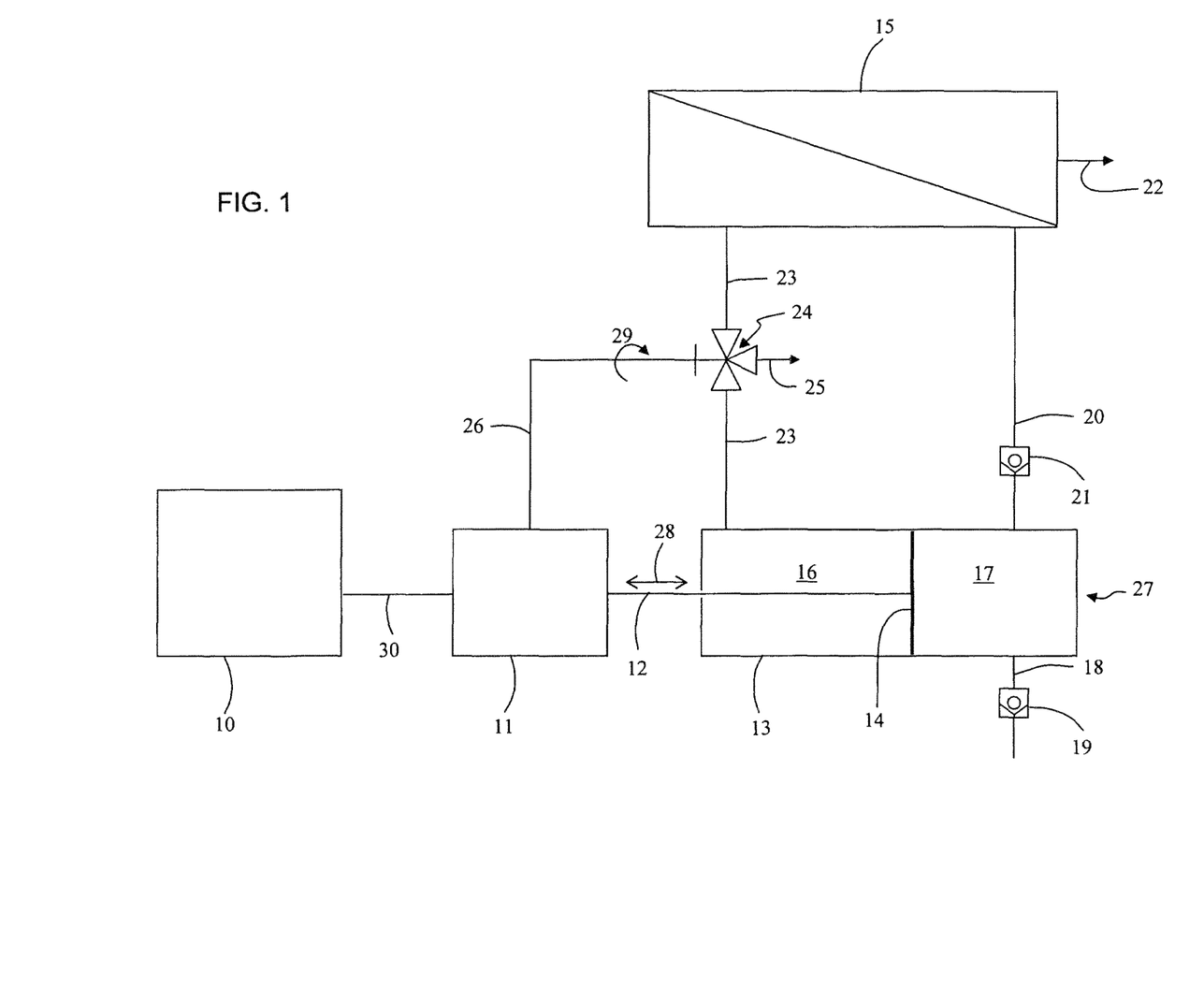
FIG. 1 is a diagram of a water-treatment plant according to one embodiment of the invention.
Figure 2:
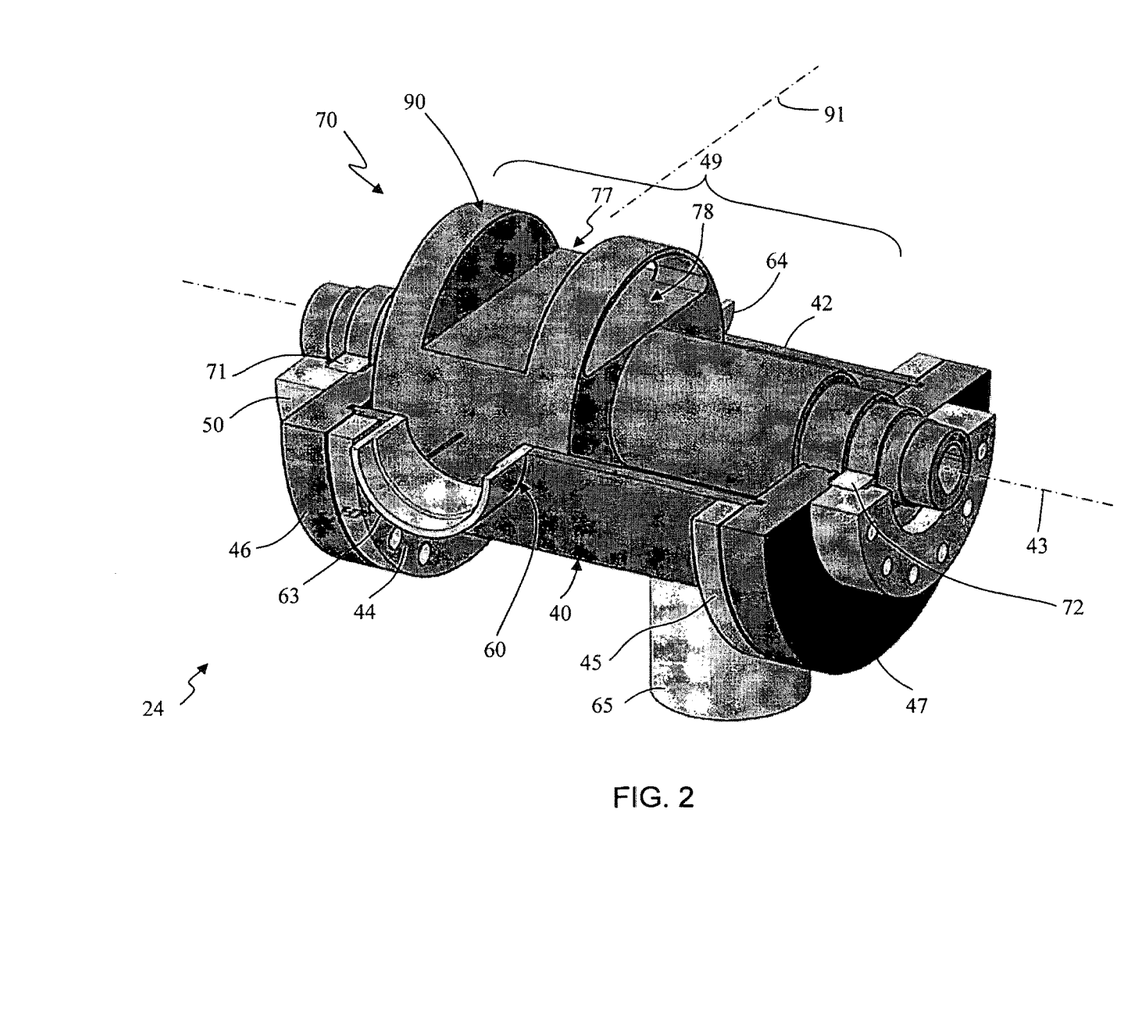
FIG. 2 is a schematic view in perspective of a valve according to one embodiment of the invention, of which the stopper is in the closed position of the valve, with partial cutaway: in this figure, as in FIGS. 4 to 6, all that appears is the portion of the valve body extending under the plane containing the longitudinal axis of the body—and of the rotor—and the axis passing through the centers of the first and second orifices, the other portion of the body extending above this plane being "cut away" (not shown) in order to make it possible to view the rotor of the valve.
Figure 3:
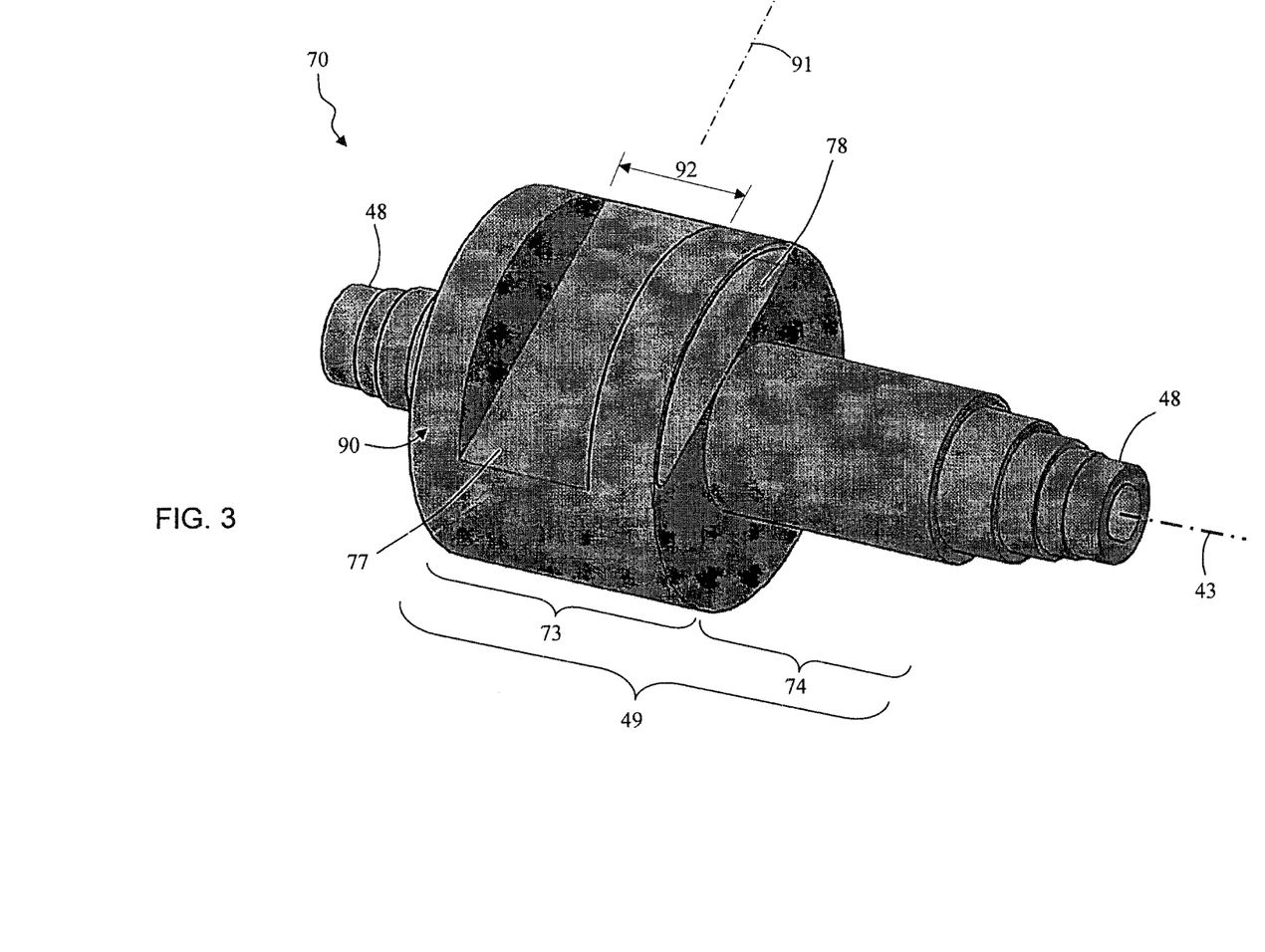
FIG. 3 is a schematic view in perspective of the rotor—including the stopper—of the valve illustrated in FIGS. 2 and 4 to 11.

With reference to FIG. 1, the water-treatment plant comprises a water-filtration module 15, a piston pump 27, an electric motor 10, a mechanism 11 for driving the pump via the output shaft 30 of the motor, and a three-way valve 24 with rotary plug.

The pump 27 comprises a body 13 delimiting a cylindrical cavity 16, 17 inside which the piston 14 of the pump is driven in alternating translation 28, the piston separating the cavity into two chambers: a first chamber 16 receiving the brine discharged from the module 15, and a second chamber 17 receiving the water to be pumped and to be delivered under pressure to the module 15.

The piston 14 is connected by a rod 12 to the mechanism 11.

The pump 27 receives the water to be pumped delivered by a water-conveying duct 18 fitted with an inlet valve element 19 (nonreturn valve element).

The water pressurized by the pump 27 is conveyed to the module 15 by a duct 20 fitted with a delivery valve element 21 (nonreturn valve element).

The water (fresh water) filtered by the module 15 leaves the latter through a duct 22, while the brine is conveyed by a duct 23 fitted with the valve 24, from the module 15 to the "energy recovery" chamber 16 of the pump 27.

The valve 24 is also connected to a duct 25 through which the brine is discharged from the chamber 16 at the end of each compression stroke of the piston 14 of the pump 27 during the stroke—in the reverse direction—of the piston 14 allowing the chamber 17 to be filled by the water to be pumped.

The transition from one configuration of the valve 24 allowing the passage of the brine originating from the module 15 to the chamber 16, to a configuration of the valve allowing the discharge of the brine from the chamber 16, results from the rotation 29 of the plug—i.e. of the stopper—of the valve.

The substantially continuous rotation of the stopper of the valve results from the driving of the stopper by the motor, in synchronism with the pump, by means of a shaft 26 for driving the stopper, this shaft 26 being connected for this purpose to the mechanism 11.

With reference to FIGS. 2 and 4 to 9, the valve 24 comprises a body 40 delimiting a cavity 41.

The body 40 comprises a tubular central part 42 extending along an axis 43, two circular flanges 44 and 45 placed and attached—by welding for example—at the two longitudinal ends of the central part 42, and two parts 46 and 47 respectively attached to the flanges 44, 45 by screws (not shown) for example.

Each part 46, 47 is in the form of a thick disk and has a circular central orifice; a shaft 48 with an axis 43 extends through these two bored orifices, this shaft being secured in rotation to the stopper or plug 49 of the valve.

The body 40 also comprises two parts 50 and 51 respectively attached to the parts 46, 47 by screws (not shown), each part 50, 51 being in the form of a thick disk, with an external diameter smaller than that of the parts 46, 47 and having a central circular orifice aligned with those of the parts 46, 47 and through which the shaft 48 extends.

The tubular collar 42 of the body is pierced with three circular orifices: a first orifice 60 allowing water to be inserted into the cavity 41, a second orifice 61 allowing water to be discharged from the cavity, and a third orifice 62 making it possible to place the cavity 41 and the chamber (reference 16, FIG. 1) of the pump in communication.

For the connection of the valve to the duct (reference 23, FIG. 1) conveying the brine originating from the filter 15, the body comprises a first tubular sleeve 63 extending in line with the orifice 60.

For the connection of the valve to the duct (reference 25, FIG. 1) for discharging the brine, the body comprises a second tubular sleeve 64 extending in line with the orifice 61.

For the connection of the valve to the duct (reference 23, FIG. 1) for conveying the brine between the valve and the pump, the body comprises a third tubular sleeve 65 extending in line with the orifice 62.

Figure 7:
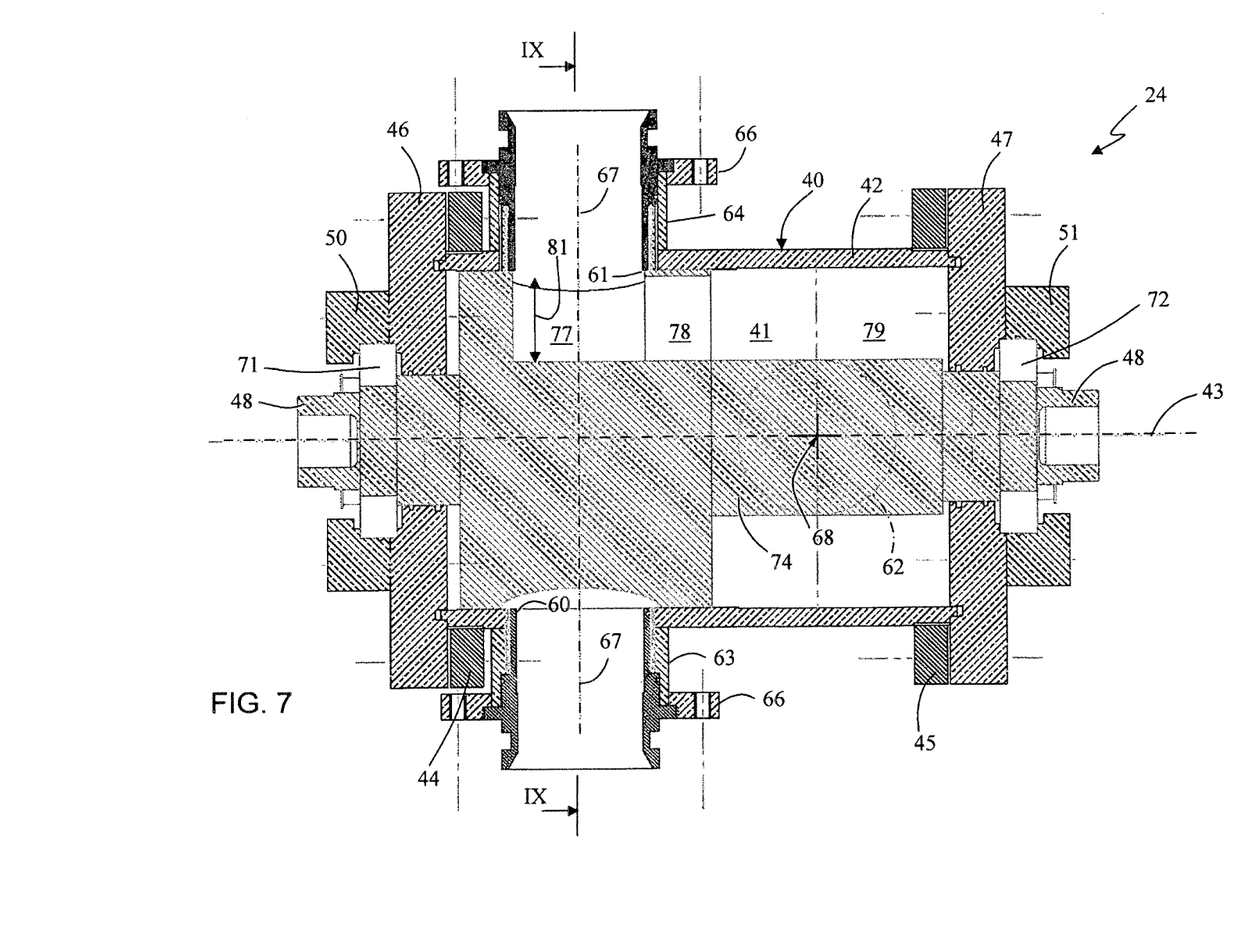
FIG. 7 is a view in longitudinal section of the valve along a first sectional plane containing the axis of two sleeves for connecting the valve to a filtration module—for one of the sleeves—and to a discharge circuit—for the second sleeve.
Figure 8:
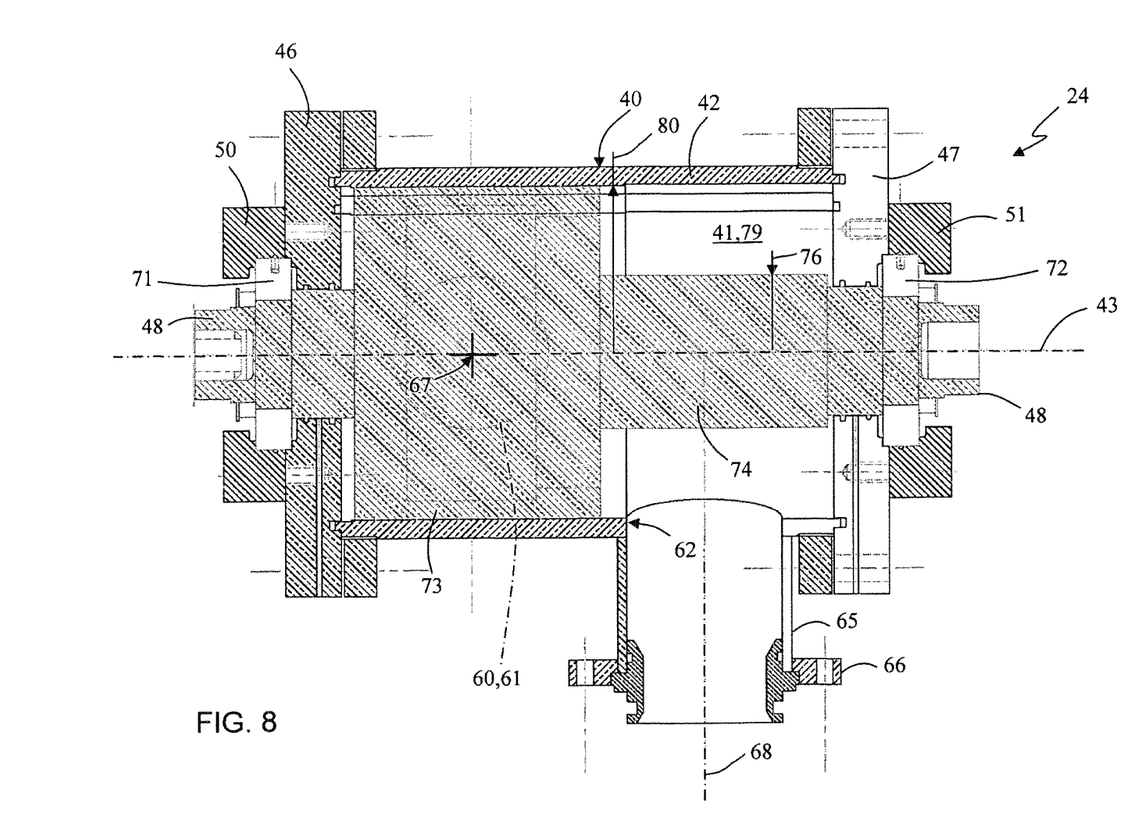
FIG. 8 is a view in longitudinal section of the valve along a second sectional plane perpendicular to the first and containing the axis of a third sleeve for connecting the valve to a piston pump.
Figure 9:
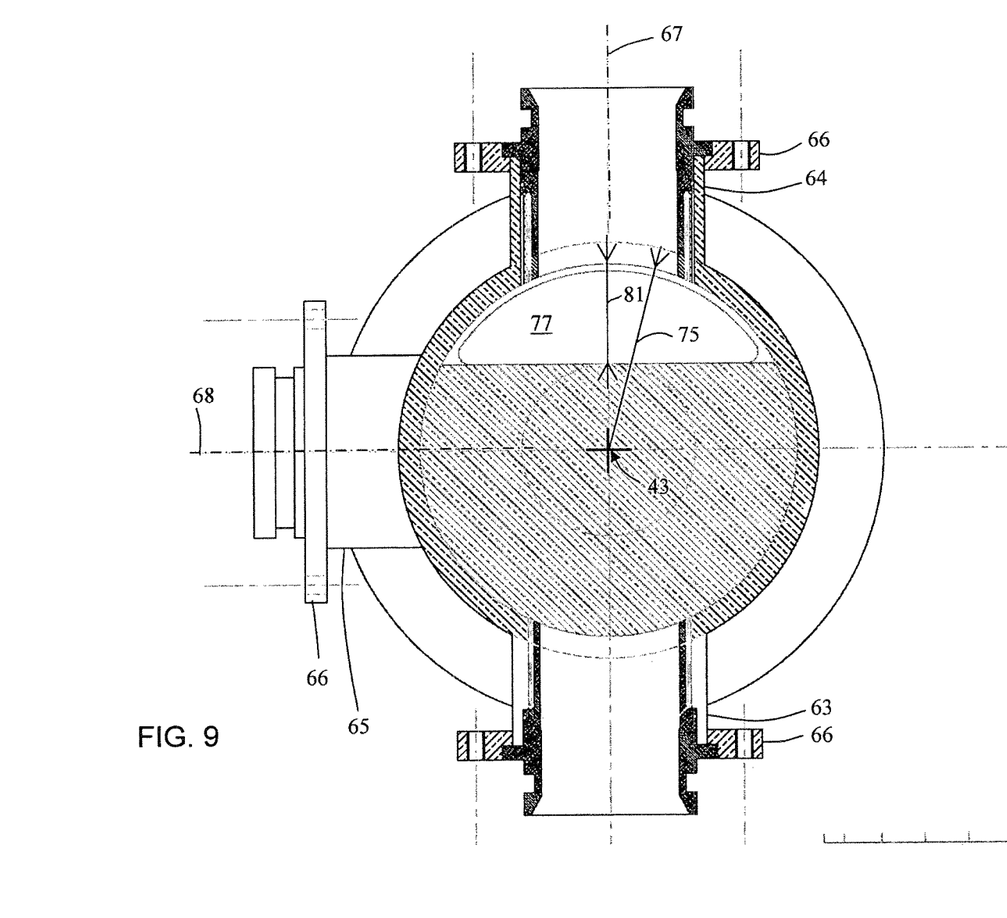
FIG. 9 is a view in cross section of the valve along a third sectional plane perpendicular to the first two and containing the axis of the third connecting sleeve: this figure is a view along IX-IX of FIG. 7.

It can be seen in FIGS. 7 to 9 that each of these three sleeves is attached to the tubular part 42 by a first of its ends, for example by welding, and is furnished with a connecting flange 66 close to its second end.

The sleeves 63 and 64 are coaxial: they extend along an axis 67 perpendicular to the axis 43 and intersecting the latter; the sleeve 65 extends along an axis 68 which is also perpendicular to the axis 43 and intersects the latter, the axes 67 and 68 being orthogonal without being secant.

With reference to FIGS. 2 to 6 in particular, the rotor 70 of the valve comprises a central portion forming the plug 49 and two end portions extending on either side of the plug and forming two shaft ends 48; these three coaxial portions, with an axis 43, can form a single part obtained by machining of a metal blank, for example, or else may consist of several parts fixed together.

It can be seen in FIGS. 2 and 4 to 8 that the stopper 49 is mounted so as to be able to rotate inside the cavity 41 of the valve body; accordingly, the rotor 70 is mounted in the bearings formed in the parts 46, 47, 50, 51 by means of two rolling bearings 71, 72 (ball bearings for example) fitted onto bearing surfaces formed by the shaft 48.

With reference to FIGS. 2 to 6 in particular, the stopper consists essentially of a first portion 73 delimited by a cylindrical casing with an axis 43 and a radius 75 (see FIG. 9), and of a second cylindrical portion 74 with an axis 43 and radius 76 (see FIG. 8) which extends from the first portion 73.

The radius 75 of the portion 73 is chosen to be slightly less than the radius 80 (see FIG. 8) of the cavity 41, for example smaller than the latter by the order of 0.1 millimeter (mm) when the radius 80 is of the order of 100 mm, so as to define a very slight clearance between the peripheral surface of the portion 73 of the stopper and the wall 42 delimiting the cavity 41.

The radius 76 of the portion 74 is chosen to be smaller than the radius 80 of the cavity 41, for example close to the radius common to the orifices 60 to 62, so that the portion 74 delimits with the wall 42 an annular space 79—or second recess—allowing water to enter the valve—or leave the latter—through the orifice 62; for this purpose, the portion 74 of the stopper—and the volume 79—preferably extend over a length at least equal to the diameter of the orifice 62 which opens into the volume 79.

As illustrated notably in FIGS. 2 to 4, 7 and 9, the portion 73 of the stopper 49 comprises a recess 77 on its outer cylindrical face 90.

This recess in the form of a groove or flat extends along an axis 91 orthogonal to the axis 43 of revolution/rotation of the stopper, and has a width 92 slightly smaller than the diameter of the first and second orifices 60, 61.

The depth 81 of the first recess 77 is substantially equal to the difference between the radius 75 of the stopper—in line with this recess—and the common (identical) radius of the orifices 60, 61.

Figure 4:
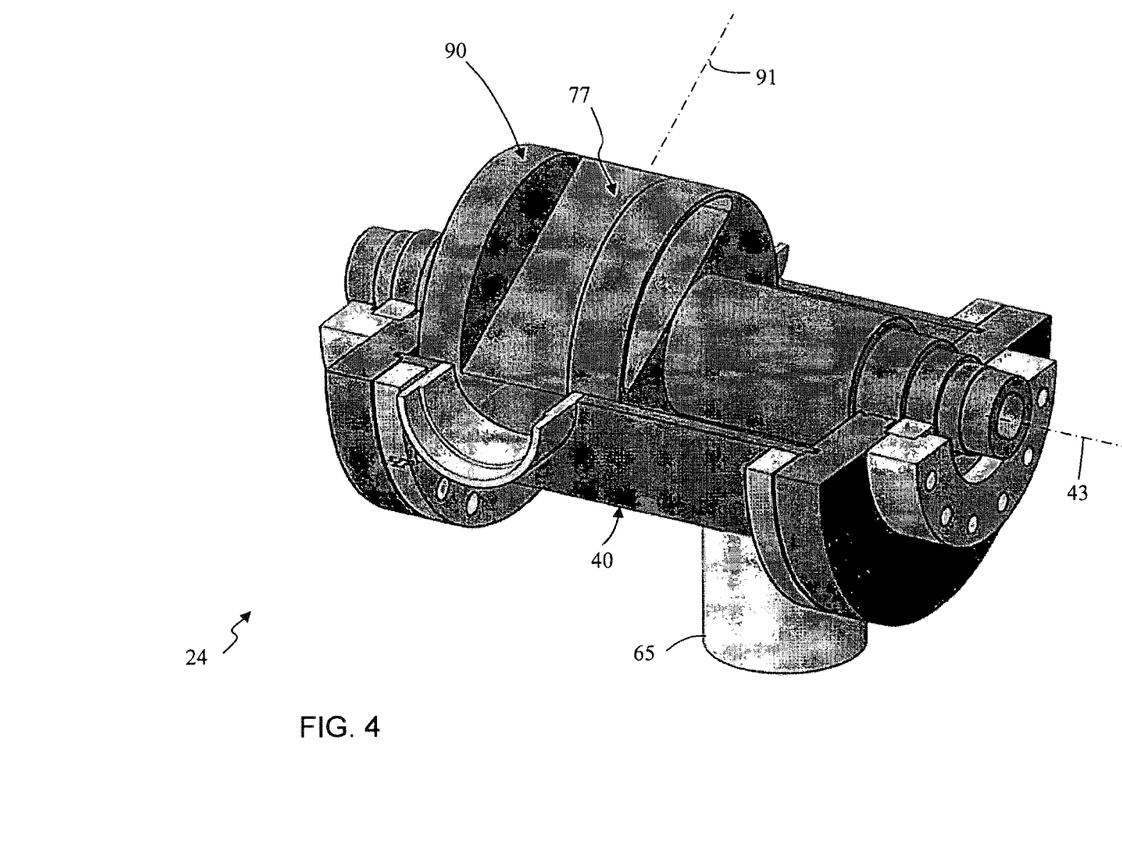
FIGS. 4 to 6 are schematic views in perspective similar to FIG. 2, which show the rotor of the valve in other angular positions.
Figure 5:
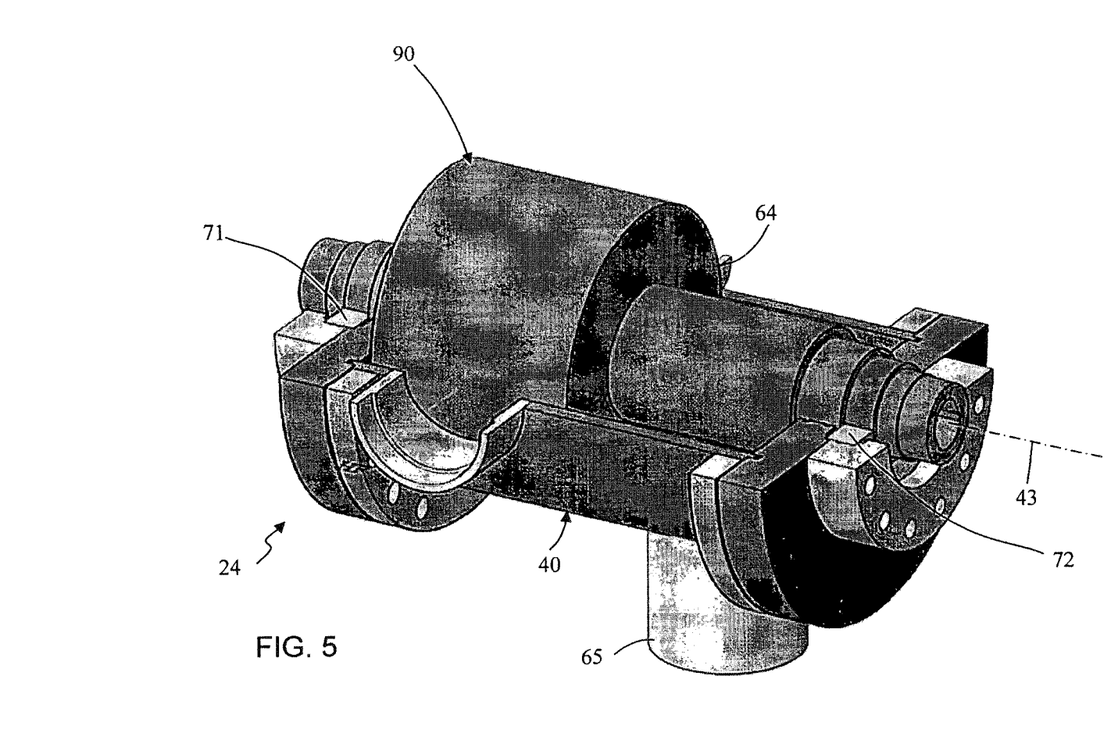

The recess 77 helps—with the body—to delimit a passageway—which rotates with the stopper—allowing water to travel between the first and third orifices in the first angular positions of the stopper, which corresponds to a configuration of the valve illustrated in FIG. 4 and allowing the pump to be supplied.

Accordingly, a channel 78 is formed in the stopper and connects the recesses 77 and 79 as illustrated in FIGS. 2 to 4 and 7 in particular.

The cross section of this channel 78 is preferably at least close to that of the first and second orifices 60, 61 and/or of that of the groove 77, in order to limit the pressure losses caused by the water entering the valve.

Figure 6:
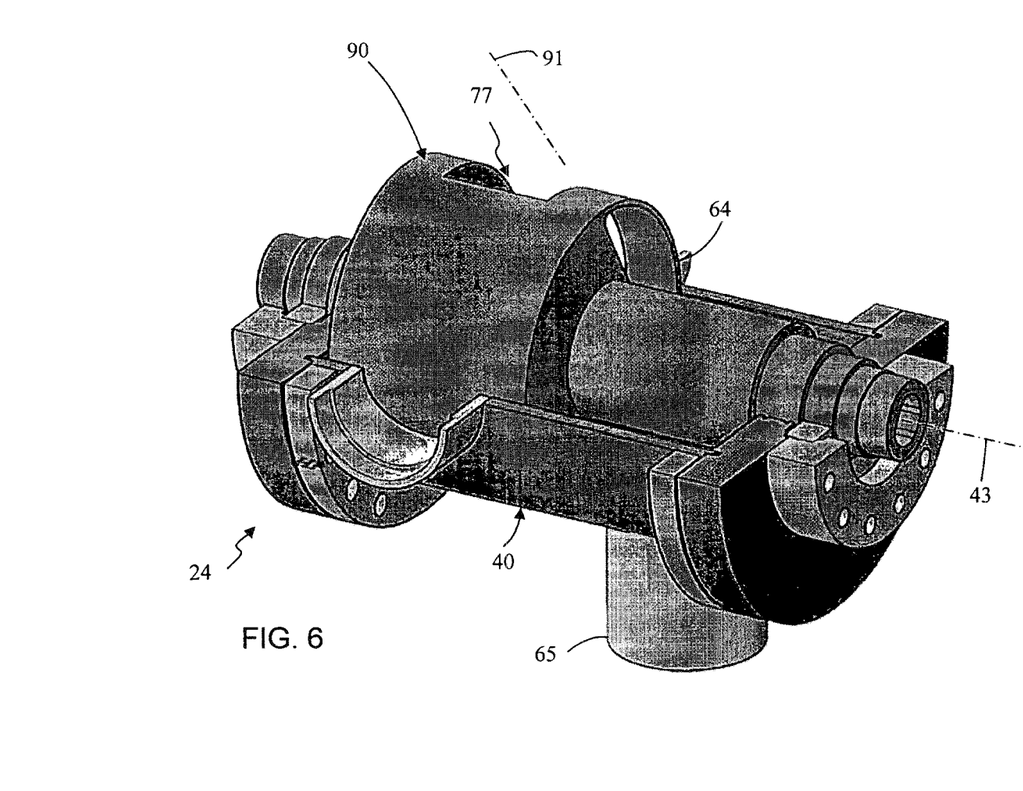

The passageway formed by the recesses 77, 79 and by the channel 78 also allows water to travel between the second and third orifices 61, 62 in second angular positions of the stopper—corresponding to a configuration of the valve allowing the pump to be discharged—which are illustrated in FIGS. 6 and 9 in particular.

The valve also comprises two sealing devices making it possible respectively to achieve a substantially water-tight stopping of the first orifice 60 by the stopper in said second angular positions of the stopper, i.e. in the discharge position, and to ensure a substantially watertight stopping of the second orifice 61 by the stopper in said first angular positions of the stopper, i.e. in the position of supplying the pump with water.

Figure 10:
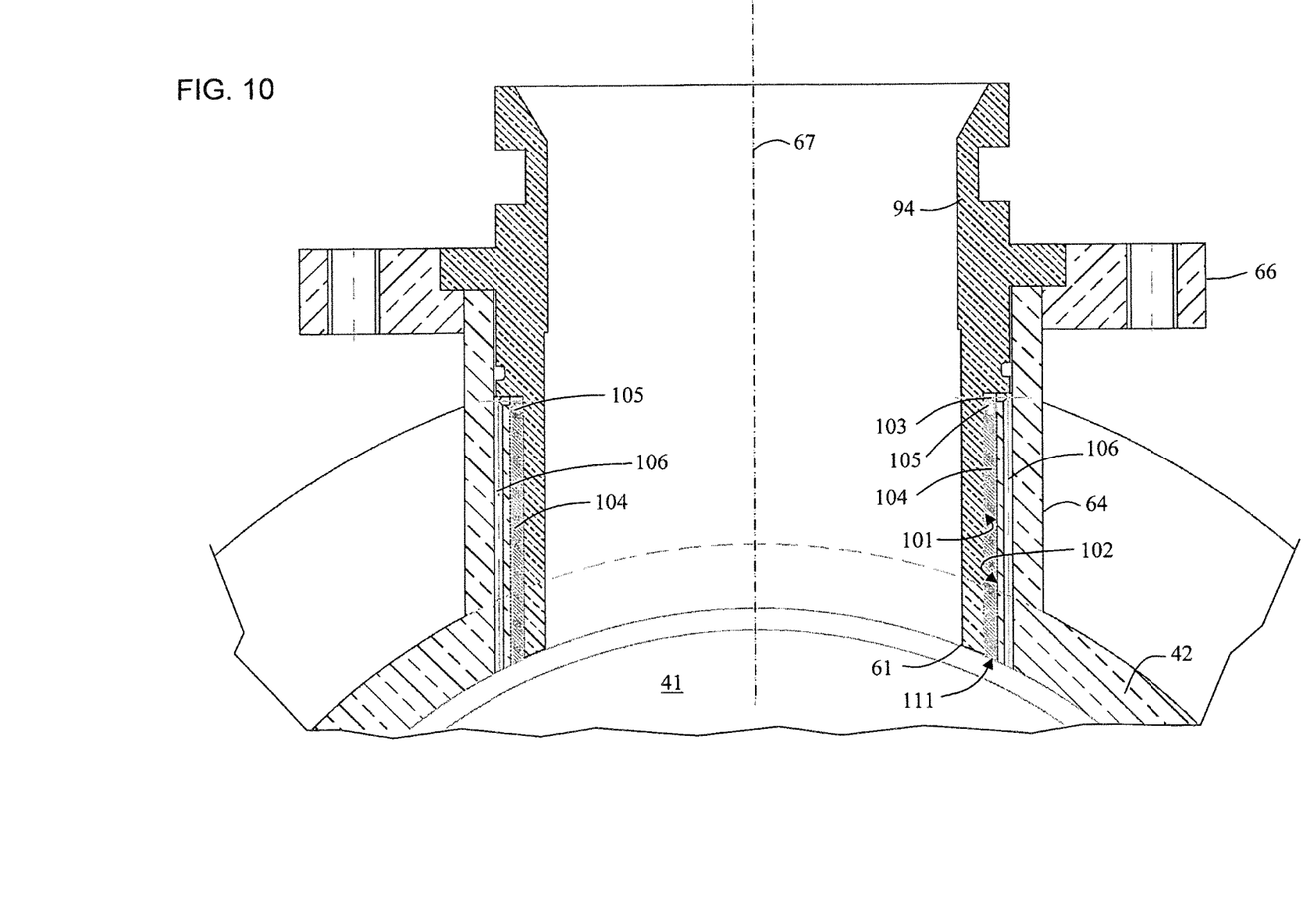
FIG. 10 is a view in longitudinal section along the first sectional plane illustrating, on an enlarged scale, the sleeve for connecting the valve of FIGS. 2 and 4 to 11 to the discharge circuit.
Figure 11:
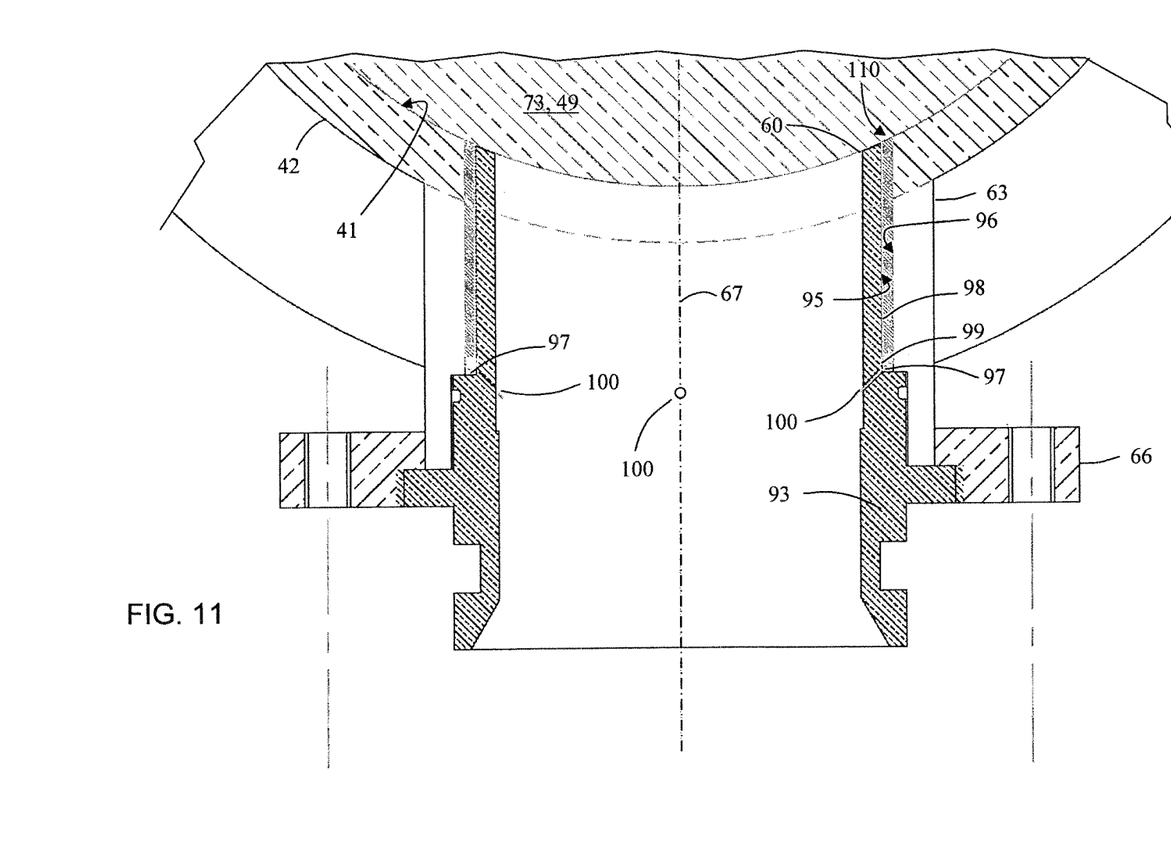
FIG. 11 is a view in longitudinal section along the first sectional plane illustrating, on a larger scale, the sleeve for connecting the valve of FIGS. 2 and 4 to 11 to the filtration module.

Accordingly, as illustrated in FIGS. 10 and 11, the body comprises two housings opening into the cavity 41 and surrounding respectively the two orifices 60, 61, and two sealing members respectively placed slidingly in the two housings.

A bush 93, 94 is fitted respectively into each of the sleeves 63, 64 with the axis 67.

With respect to the sleeve 63, in FIG. 11, an outer cylindrical face 95 of the bush 93 extends coaxially to an inner cylindrical face 96 of the sleeve 63, facing the latter, so as to delimit a housing 97 receiving a sliding sealing ring 98 and a seal 99.

With respect to the sleeve 64, in FIG. 10, an outer cylindrical face 101 of the bush 94 extends coaxially to an inner cylindrical face 102 of the sleeve 64, facing the latter, so as to delimit a housing 103 receiving a sliding sealing ring 104 and a seal 105.

The housings 97, 103 take the form of annular slots and the sealing members 98, 104 have an annular—or tubular—shape adapted to the dimensions of the housings and to the shape of the portion of the stopper against which they are pressed: each sealing ring 98, 104 has, at its end 110, 111 being flush in the cavity 41, a shape that is cut away according to a radius corresponding to the radius of the cylindrical portion 73 of the stopper.

A pressing device makes it possible to press the sealing ring 98 against the stopper, in order to ensure a substantially watertight stopping of the first orifice 60, by the stopper, in angular positions of the stopper in which no portion of the groove 77 is facing this orifice.

A similar pressing device makes it possible to press the sealing ring 104 against the stopper, in order to ensure a substantially watertight stopping of the second orifice 61, by the stopper, in angular positions of the stopper in which no portion of the groove 77 is facing this orifice.

Each of the pressing devices comprises several channels which connect one end (of the housing in question) that is opposite to the end of the housing in question that opens into the cavity, upstream—with reference to the direction of flow of the water in the valve—of the orifice in question: the pressing device associated with the sealing member 98 surrounding the first orifice 60 comprises four channels 100 distributed angularly about the axis 67, each connecting the non-open end of the housing 97 to the inner face of the bush 93 of the sleeve 63.

Similarly, the pressing device associated with the sealing member 104 surrounding the second orifice 61 comprises four channels 106 distributed angularly about the axis 67 and parallel with the latter, which are formed inside the sleeve 64 and each link the non-open end of the housing 103 to the cavity 41.

The channels 100 make it possible to place the non-open end of the housing 97 and the duct conveying the water coming from the filtration module at equal pressure.

The channels 100 consequently make it possible to press against the stopper 49 the "profiled" end of each of the sliding sealing member 98, because of the difference between the water pressures that are applied to the two opposite ends of the member 98.

Similarly, the channels 106 make it possible to place the non-open end of the housing 103 and the cavity 41 at equal pressure and consequently make it possible to press the "profiled" end of each of the sliding sealing member 104 against the stopper, because of the difference between the pressures that are applied to the two opposite ends of the member 104.

Figure 12:
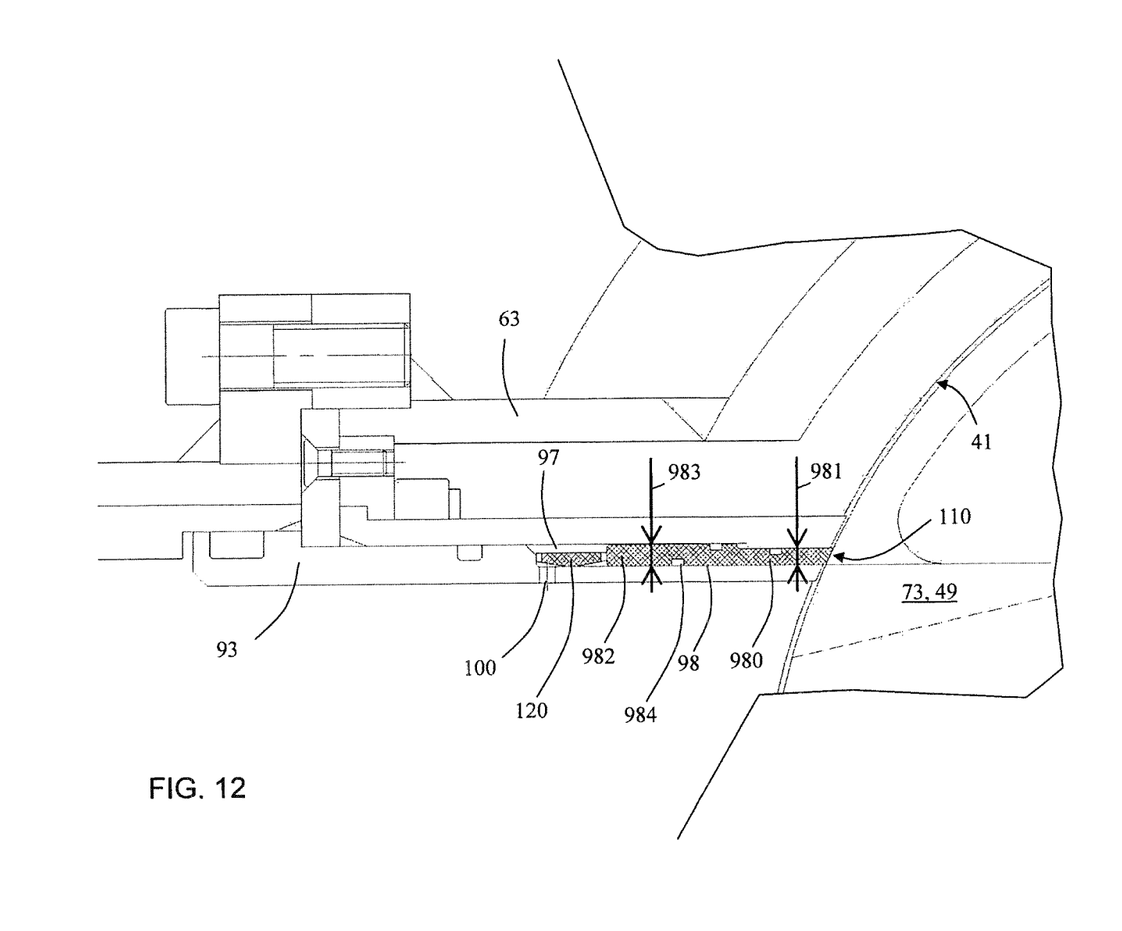
FIG. 12 is a view in section along the first sectional plane illustrating, on a larger scale, another embodiment of the sealing device fitted to the sleeve for connecting the valve to a filtration module.

In the embodiment illustrated in FIG. 12, the sealing member 98 comprises a first annular portion 980 having a first thickness 981 and of which one end is flush with the surface of the body delimiting the cavity 41.

The member 98 comprises a second annular portion 982 coaxial with—and extending—the first annular portion 980.

This second portion, which extends facing—and in the vicinity of—the non-open end of the housing 97 and of the channels 100, has a thickness 983 greater than the thickness 981 so that the ring 98 is pushed back toward the stopper when its two longitudinal ends are subjected to the same pressure.

In order to prevent (or limit) water getting into the interstices extending between the ring 98 and the housing 97 in which the ring can slide, each of the annular portions 980, 982 of the ring is furnished with an annular housing—like that referenced 984—receiving a sealing-ring member (not shown).

Moreover, an elastically deformable member 120, in the form of a ring forming a spring, is placed in the housing 97 receiving the ring 98, between the non-open end of the housing 97 and the end of the portion 982 of the ring 98.

The elastic ring 120 is arranged to keep in mutual contact the stopper 49 and the end 110 of the sealing ring 98 when the valve is not operated and/or when no water current passes through it.

The invention claimed is:

1. A valve comprising:
    a valve body delimiting a cavity, the body being provided with a first orifice allowing water to enter the cavity, with a second orifice allowing water to be discharged from the cavity, and a third orifice making it possible to place the cavity and a chamber in communication;
    a stopper or plug mounted to as to be able to rotate inside the cavity, the stopper comprising a (first) recess on its outer face, this recess helping, with the body, to delimit a passageway allowing water to travel between the first and third orifices in first angular positions of the stopper, said passageway allowing water to travel between the second and third orifices in second angular positions of the stopper;
    wherein said stopper comprises a second recess, arranged along the periphery of the stopper, said second recess facing in fluidic communication the third orifice at all angular positions of said stopper, and a channel formed in the stopper and connecting the first and second recesses;
    a first sealing device arranged so as to provide a substantially watertight stopping of the first orifice by the stopper in said second angular positions of the stopper; and
    a second sealing device arranged so as to provide a substantially watertight stopping of the second orifice by the stopper in said first angular positions of the stopper,
    wherein the first sealing device comprising a first housing and the second sealing device comprising a second housing, said first and second housings leading into the cavity and surrounding respectively the first and second orifices, a first sealing member slidingly arranged in said first housing, and a first pressing device for pressing the first sealing member against the stopper, a second sealing member slidingly arranged in said second housing, and a second pressing device for pressing the second sealing member against the stopper,
    wherein the first and second housings are in the shape of annular slots and the first and second sealing members have an annular—or tubular—shape adapted to the shape of the portion of the stopper against which they are pressed, and
    wherein the first pressing device associated with the first sealing member surrounding the first orifice comprises at least one first connecting channel, said first connecting channel connecting in fluidic communication the non-open end of the first housing to the inner face of a first sleeve connecting the valve to a duct, while the second pressing device associated with the second sealing member surrounding the second orifice comprises at least one second connecting channel, said second connecting channel connecting in fluidic communication the non-open end of the second housing to the cavity.

2. The valve as claimed in claim 1, wherein the first recess is in the shape of a groove or flat extending along an axis orthogonal to the axis of rotation of the stopper, and has a width smaller than the diameter of the first and second orifices.

3. The valve as claimed in claim 1, wherein the respective diameters of the first and second orifices are equal, and the depth of the first recess is substantially equal to the difference between the radius of the stopper—in line with this recess—and the radius of the orifices.

4. The valve as claimed in claim 1, wherein the first and second orifices are facing one another, aligned along an axis substantially orthogonal to the axis of revolution of the cavity, these two axes being substantially coplanar.

5. The valve as claimed in claim 1, wherein the valve body is pierced with two other orifices facing one another, aligned along an axis that is substantially indistinguishable from the axis of revolution of the cavity, and the stopper is secured in rotation to a drive shaft extending through these two orifices.

6. The valve as claimed in claim 1, wherein the first angular positions of the stopper are adjacent so as to form a first continuous angular range of first angular positions of the stopper, and wherein the second angular positions of the stopper are adjacent so as to form a second continuous angular range of second angular positions of the stopper, and wherein each of the first and second continuous angular ranges extends substantially over 180° (angle degrees).

7. The valve as claimed in claim 1, wherein each of the annular-shaped sealing members comprises a first annular portion having a first thickness and of which one end is flush with the surface of the body delimiting the cavity, and each of the sealing members comprises a second annular portion having a second thickness and of which one end extends facing—and in the vicinity of—the non-open end of the corresponding housing, the second thickness being greater than the first thickness.

8. The valve as claimed in claim 1, wherein each of the pressing devices comprises an elastically deformable member placed in the corresponding housing, between the non-open end of the housing and the end of the corresponding sealing member, and arranged so as to keep the stopper and the sealing member in mutual contact when the valve is not operated and when no water current passes through it.

9. A water-treatment plant comprising a water-filtration module, a pump with a piston, a motor, a mechanism for the driving of the pump by the motor, and a valve as claimed in claim 1, the valve being fitted to a duct connecting the pump to the filtration module, the stopper of the valve being arranged so as to be rotated substantially continuously by the motor, in synchronism with the pump.

10. The plant as claimed in claim 9, wherein the duct conveys brine to a chamber for recovering energy of the pump to the filtration module.

11. The plant as claimed in claim 10, wherein the valve comprises:
    a valve body delimiting a cavity, the body being provided with a first orifice allowing water to enter the cavity, with a second orifice allowing water to be discharged from the cavity, and a third orifice making it possible to place the cavity and a chamber in communication;
    a stopper or plug mounted to as to be able to rotate inside the cavity, the stopper comprising a (first) recess on its outer face, this recess helping, with the body, to delimit a passageway allowing water to travel between the first and third orifices in first angular positions of the stopper, said passageway allowing water to travel between the second and third orifices in second angular positions of the stopper;

a first sealing device arranged so as to provide a substantially watertight stopping of the first orifice by the stopper in said second angular positions of the stopper; and a second sealing device arranged so as to provide a substantially watertight stopping of the second orifice by the stopper in said first angular positions of the stopper, the valve having the first and second sealing devices each comprise a housing leading into the cavity and surrounding respectively the first and second orifices, a sealing member placed so as to slide in each housing, and a pressing device for pressing the corresponding sealing member against the stopper, in that the housings are in the shape of annular slots and the sealing members have an annular—or tubular—shape adapted to the shape of the portion of the stopper against which they are pressed, in particular a shape cut away like a bevel on a radius corresponding to the radius of a cylindrical portion of the stopper, and in that the pressing device associated with the sealing member surrounding the first orifice comprises at least one channel connecting the non-open end of the housing to the inner face of a sleeve for connecting the valve to a duct, while the pressing device associated with the sealing member surrounding the second orifice comprises at least one channel connecting the non-open end of the housing to the cavity.

12. The plant as claimed in claim 9, wherein the valve is connected to a duct through which the brine is discharged from the chamber for recovering energy of the pump, after each compression stroke of the piston of the pump, during the stroke—in the reverse direction—of the piston allowing the filling, by the water to be pumped, of a pumping chamber of the pump.

13. The plant as claimed in claim 9, wherein the transition from a configuration of the valve allowing the passage of the brine originating from the module to the chamber for recovering energy of the pump, to a configuration of the valve allowing the discharge of the brine from the chamber for recovering energy of the pump, results from the rotation of the plug of the valve.

14. The plant as claimed in claim 9, wherein the body comprises a first tubular sleeve extending in line with the orifice, for the connection of the valve to the duct conveying the brine originating from the filter.

15. The plant as claimed in claim 9, wherein the body comprises a second tubular sleeve extending in line with the orifice for the connection of the valve to a duct for discharging the brine.

16. The plant as claimed in claim 9, wherein the body comprises a third tubular sleeve extending in line with the orifice for the connection of the valve to the duct for conveying the brine between the valve and the pump.

17. The plant as claimed in claim 10, wherein the valve is connected to a duct through which the brine is discharged from the chamber for recovering energy of the pump, after each compression stroke of the piston of the pump, during the stroke—in the reverse direction—of the piston allowing the filling, by the water to be pumped, of a pumping chamber of the pump.

18. The plant as claimed in claim 10, wherein the transition from a configuration of the valve allowing the passage of the brine originating from the module to the chamber for recovering energy of the pump, to a configuration of the valve allowing the discharge of the brine from the chamber for recovering energy of the pump, results from the rotation of the plug of the valve.

19. The plant as claimed in claim 10, wherein the body comprises a first tubular sleeve extending in line with the orifice, for the connection of the valve to the duct conveying the brine originating from the filter.

20. The plant as claimed in claim 10, wherein the body comprises a second tubular sleeve extending in line with the orifice for the connection of the valve to a duct for discharging the brine.

21. The plant as claimed in claim 10, wherein the body comprises a third tubular sleeve extending in line with the orifice for the connection of the valve to the duct for conveying the brine between the valve and the pump.

22. The valve as claimed in claim 1, wherein said sealing members have a shape cut away in a bevel's shape on a radius corresponding to the radius of a cylindrical portion of the stopper against which they are pressed.

* * * * *